United States Patent
Addington

(10) Patent No.: US 10,532,307 B2
(45) Date of Patent: Jan. 14, 2020

(54) FILTER HOUSING FOR AN AIR VENTILATION SYSTEM

(71) Applicant: Camfil AB, Stockholm (SE)

(72) Inventor: Richard Addington, Shanghai (CN)

(73) Assignee: Camfil AB, Stockholm (SE)

( * ) Notice: Subject to any disclaimer, the term of this patent is extended or adjusted under 35 U.S.C. 154(b) by 96 days.

(21) Appl. No.: 15/573,802

(22) PCT Filed: May 11, 2016

(86) PCT No.: PCT/EP2016/060543
§ 371 (c)(1),
(2) Date: Nov. 13, 2017

(87) PCT Pub. No.: WO2016/180871
PCT Pub. Date: Nov. 17, 2016

(65) Prior Publication Data
US 2018/0147518 A1 May 31, 2018

(30) Foreign Application Priority Data
May 13, 2015 (SE) ..................... 1550623

(51) Int. Cl.
*B01D 46/10* (2006.01)
*B01D 46/00* (2006.01)
(Continued)

(52) U.S. Cl.
CPC ..... *B01D 46/0006* (2013.01); *B01D 46/0086* (2013.01); *B01D 46/10* (2013.01);
(Continued)

(58) Field of Classification Search
CPC ............ B01D 46/0006; B01D 46/4227; B01D 46/0086; B01D 46/0005; B01D 46/10;
(Continued)

(56) References Cited

U.S. PATENT DOCUMENTS

| 4,498,914 A * | 2/1985 | Ericksen ............ B01D 46/0005 |
| | | 292/245 |
| 4,521,234 A * | 6/1985 | Peebles, Jr. ........ B01D 46/0091 |
| | | 55/481 |

(Continued)

FOREIGN PATENT DOCUMENTS

| EP | 2561915 A1 | 2/2013 |
| WO | WO 2012/134650 | 10/2012 |
| WO | WO 2014/146695 | 9/2014 |

OTHER PUBLICATIONS

International Search Report and Written Opinion for International Application No. PCT/EP2016/060543 dated Aug. 19, 2016 in 8 pages.

*Primary Examiner* — Minh Chau T Pham
(74) *Attorney, Agent, or Firm* — Knobbe, Martens, Olson & Bear LLP

(57) ABSTRACT

A filter housing is adapted to be mounted in an air ventilation system and includes: an upstream air entrance opening defined by an air entrance opening frame, a downstream air exit opening defined by an air exit opening frame, a rear wall, a front opening opposite to the rear wall, a cover sealing the front opening, a movable filter holder arranged within the housing and arranged to receive a filter through the front opening, and two clamping mechanisms arranged at opposite first and second walls of the housing. Each clamping device has a release device engaged with the filter holder, and is arranged for releasing the filter from the clamped position to a released position by moving the filter holder.

9 Claims, 7 Drawing Sheets

(51) Int. Cl.
*B01D 46/42* (2006.01)
*F24F 3/16* (2006.01)

(52) U.S. Cl.
CPC ........ *B01D 46/4227* (2013.01); *F24F 3/1603* (2013.01); *B01D 2265/025* (2013.01); *F24F 2003/1614* (2013.01)

(58) Field of Classification Search
CPC .............. B01D 2265/025; F24F 3/1603; F24F 2003/1614
USPC ......... 55/481, 484, 490, 493, 500, 504, 502, 55/DIG. 9, DIG. 34; 454/187
See application file for complete search history.

(56) References Cited

U.S. PATENT DOCUMENTS

| | | | | |
|---|---|---|---|---|
| 9,956,514 B2* | 5/2018 | Kim | .................... | B01D 46/0005 |
| 2006/0272301 A1* | 12/2006 | Morse | ................ | B01D 46/0086 |
| | | | | 55/439 |
| 2013/0097979 A1* | 4/2013 | Mann | ..................... | B01D 46/42 |
| | | | | 55/357 |
| 2016/0067642 A1* | 3/2016 | National | ............ | B01D 46/0005 |
| | | | | 55/480 |
| 2017/0191452 A1* | 7/2017 | Baek | .................... | B01D 46/001 |

\* cited by examiner

FILTER HOUSING FOR AN AIR VENTILATION SYSTEM

FIELD OF THE INVENTION

The present invention relates to air ventilation systems and more particularly to a filter housing adapted to be mounted in such a system.

BACKGROUND OF THE INVENTION

In air ventilation systems requiring high efficiency filters such as High-Efficiency Particulate Air (HEPA) filters and other high efficiency filters, it is known to use filter housings with some type mechanical clamping mechanism to secure and effectively clamp and seal the filter within the filter housing. WO2012/134650 discloses a filter frame assembly, which supports the filter and which is movably arranged in the filter housing, with an adjustable mechanical clamping mechanism including a frame having a downstream member coupled to a cross member, the downstream member and the cross member being adapted to fit within the housing. The filter frame assembly comprises at least two clamping mechanisms each coupled to a respective handle which is used to displace a part of the filter frame assembly thereby clamping a filter unit received in a filter receiving aperture defined above the cross-member. When utilizing such mechanical clamping mechanisms to seal high efficiency filters, it is a requisite to ensure that any bypass or leakage around the seal is less than the maximum penetration of the filter.

Filter housings with filter frame assemblies and clamping mechanisms as described above are typically used in critical filtration applications like for instance nuclear, pharmaceutical and risk laboratories. Very high safety standards complying with for instance increasingly stringent requirements from bio-safety authorities are thus applied. Periodic replacement of the filters is required to meet regulatory, and may involve the replacement of a large number of filters on a regular bases. A potential problem with the clamping mechanism of the above type and others is that any mistake made during replacement of the filters in the air ventilation system, e.g. if the filters are not properly positioned, the clamping mechanism are not properly closed etc, could cause leakage of hazardous substances to the surroundings.

Typically, a so called bag-in/bag-out solution is used for safely handling the change of filters capable of separating hazardous substances such as radioactive, toxic or bacterial particles and gases. A bag is arranged at an exchange opening and the filter exchange is handled inside of the bag by means of gloves being a part of the bag. There is also a compulsory demand to check that a mounted filter within the housing is leak free and conforms to the filtration class. This is done by including a probe as a part of the filter housing, and mounting the probe downstream of the filter. The probe, having an air intake and providing air samples to an analyzer, is moved in a controlled pattern as close as possible to the filter surface in order to secure a sample from a very small area of the filter at the time. It is a demand to probe a very small area if a leak should be possible to spot as an increase of concentration by the analyzer. Therefore it is desirable to have the probe mounted close to the filter surface and with an unobstructed air flow reaching the probe from the filter. This is an area of the filter housing traditionally occupied by the clamping mechanism. Mounting the clamping device on the downstream side under the filter lend itself to less complicated solutions and are widely in use, while causing air flow obstruction.

However, some efforts to move the clamping mechanism to the sides of the filter holding frame have also been made, such as in a product called BIBO filter housing of BG series, manufactured by Flanders/CSC Corporation. However, while possibly providing space for a downstream probe, the clamping mechanism has to be operated by means of a tool for turning bolt head shaped elements for loosening and tightening the clamping mechanism, which is troublesome within the bag. Furthermore, the BG series BIBO filter housing provides no clear indicator of whether the filter has been correctly positioned or not, neither before nor after clamping it.

SUMMARY OF THE INVENTION

It would advantageous to provide a solution which enables mounting of the probe suitably close to the filter at its downstream side, while providing a facilitated yet secure exchange of filters.

To better address this concern, in a first aspect of the invention there is presented a frame assembly for an air filter, which frame assembly comprises a filter housing adapted to be mounted in an air ventilation system, wherein the filter housing comprises:

an upstream air entrance opening defined by an air entrance opening frame, a downstream air exit opening defined by an air exit opening frame and located opposite of the air entrance opening, a rear wall extending between and attached with the air entrance opening frame and the air exit opening frame, a front opening opposite to the rear wall, the front opening being defined by a front opening frame, and a cover sealing the front opening when the cover is closed;

a movable filter holder arranged within the housing and arranged to receive a filter through the front opening; and two clamping mechanisms arranged at opposite first and second walls of the housing, which first and second walls extend between the entrance opening frame and the exit opening frame, each clamping mechanism being connected with the filter holder to clamp the filter in a clamped position.

Each clamping device comprises a release device engaged with the filter holder, and arranged for releasing the filter from the clamped position to a released position by moving the filter holder, which release device comprises a handle arranged at the front opening.

Each handle is arranged to be in a locked state when the filter is in the clamped position, arranged to be unlocked by being pulled out a distance to a pulled out and non-rotated position, and arranged to be rotated from the pulled out and non-rotated position to a release position in order to release the filter.

By arranging the clamping mechanisms and the release devices along the first and second walls, they do not obstruct with a probe device arranged downstream of the filter, and thus the probe device can be arranged at a most suitable distance from the filter. Additionally, the handle arrangement provides for securing that an exchange filter is correctly mounted.

In accordance with an embodiment of the filter housing, each release device comprises a non-circular centre rod, which is attached to the handle, and eccentric disks, which are rotatably connected with the filter holder, wherein the centre rod has a non-circular cross-section, wherein the centre rod extends through correspondingly non-circular holes of the eccentric disks, and wherein the centre rod is axially movable and non-rotatable relative to the eccentric disks. Thereby the combined function of enabling the handles to be pulled out for rotation, and moving the filter holder by means of the rotation is advantageously provided.

In accordance with an embodiment of the filter housing, each clamping device comprises a biasing spring device for biasing the filter holder in a clamping direction towards the entrance opening frame to clamp the filter in a clamped position by means of a predetermined spring force. Thereby the filter is evenly clamped independently of any operation force applied on the clamping mechanism by an operator.

In accordance with an embodiment of the filter housing, each handle comprises a security element, which prevents the handle from being returned to the locked state from the release position if the filter is incorrectly mounted in the filter holder. This is an advantageous way to ensure correct mounting of the filter.

In accordance with an embodiment of the filter housing, the security element comprises a protrusion, which is arranged to hit the filter thereby preventing the handle from being reversely rotated from the release position if the filter is not fully inserted into the filter housing. This is an advantageously simple implementation of the security element.

In accordance with an embodiment of the filter housing, each release device comprises a centre rod, connected with the handle, rotatably connected with the front opening frame and the rear wall, and extending along the first or second wall, wherein the centre rod is provided with a locking prevention portion, which prevents the centre rod from being moved rearwards, and thereby prevents the handle from being pushed in, when the handle has been rotated away from the pulled out and non-rotated position. This embodiment, in an advantageous way, ensures that the clamping mechanism has been fully activated before finishing the mounting of the filter.

In accordance with an embodiment of the filter housing, the filter holder comprises a groove at each centre rod, which groove extends in parallel with a portion of the centre rod, and wherein the locking prevention portion comprises a protrusion, which is aligned with the groove merely when the handle is non-rotated, thereby allowing the handled to be pulled out and pushed in, respectively. This is an advantageously simple implementation for preventing undesirable locking.

In accordance with an embodiment of the filter housing, it further comprises a probe device, which is arranged downstream of the filter holder. Since the clamping mechanisms and the release devices are not arranged downstream of the filter there is good room for the probe device.

In accordance with an embodiment of the filter housing, the cover has a recess in which the handles are received when the cover is closed, wherein the recess has a depth, which is deep enough to enable the cover to seal the front opening when the handles are in the locked state, and which is shallow enough to disable the cover from sealing the front opening when the handles are in a pulled out state. Thereby it is simply not possible to close the cover with the filter inside the filter housing unless the handles are locked, and consequently unless the filter is correctly positioned and clamped.

BRIEF DESCRIPTION OF THE DRAWINGS

The invention will now be described in more detail and with reference to the appended drawings in which.

DESCRIPTION OF EMBODIMENTS

Figure 1:
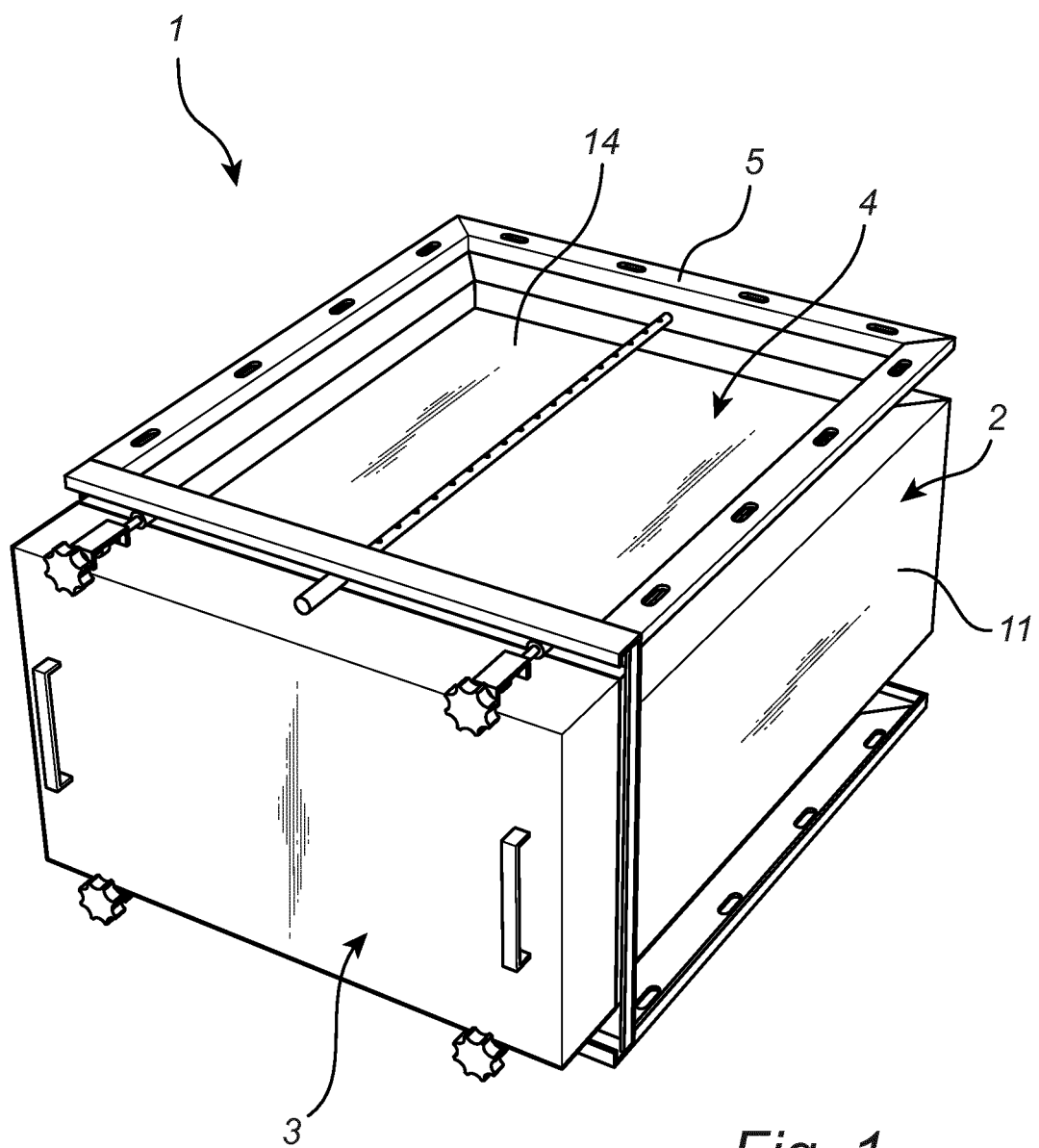
FIG. 1 is a perspective view of an embodiment of a filter housing according to the present invention.
Figure 2:
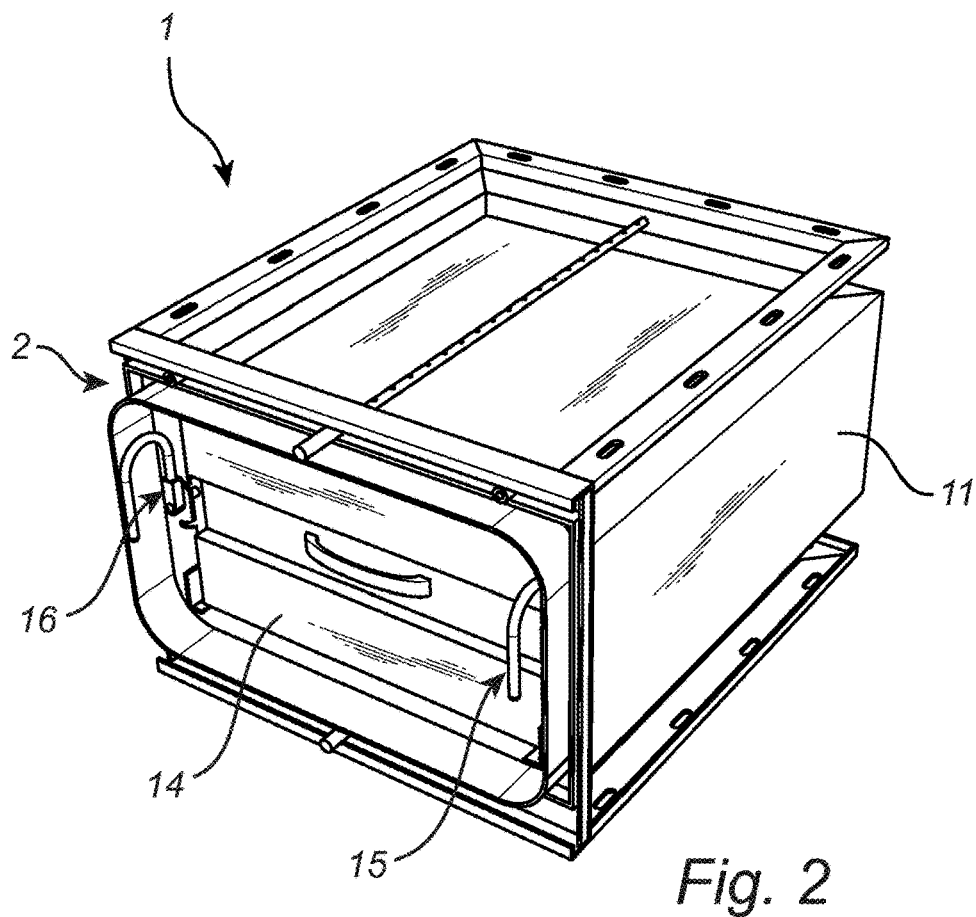
FIG. 2 shows the filter housing of FIG. 1 with the cover removed but a filter mounted.
Figure 3:
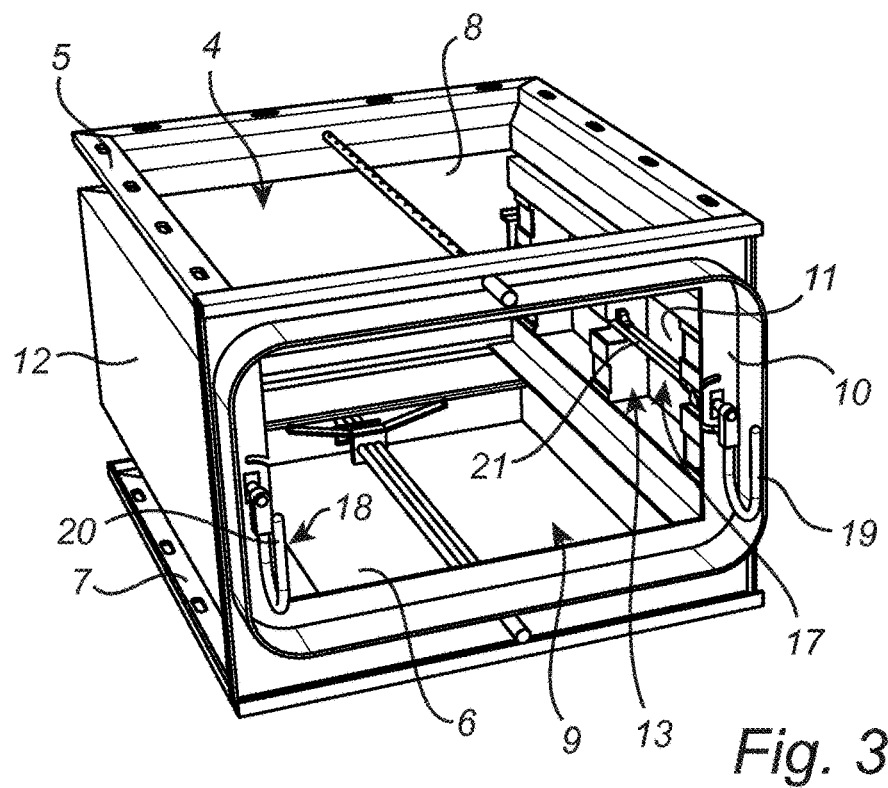
FIG. 3 shows the filter housing of FIG. 2 with the filter removed.
Figure 4:
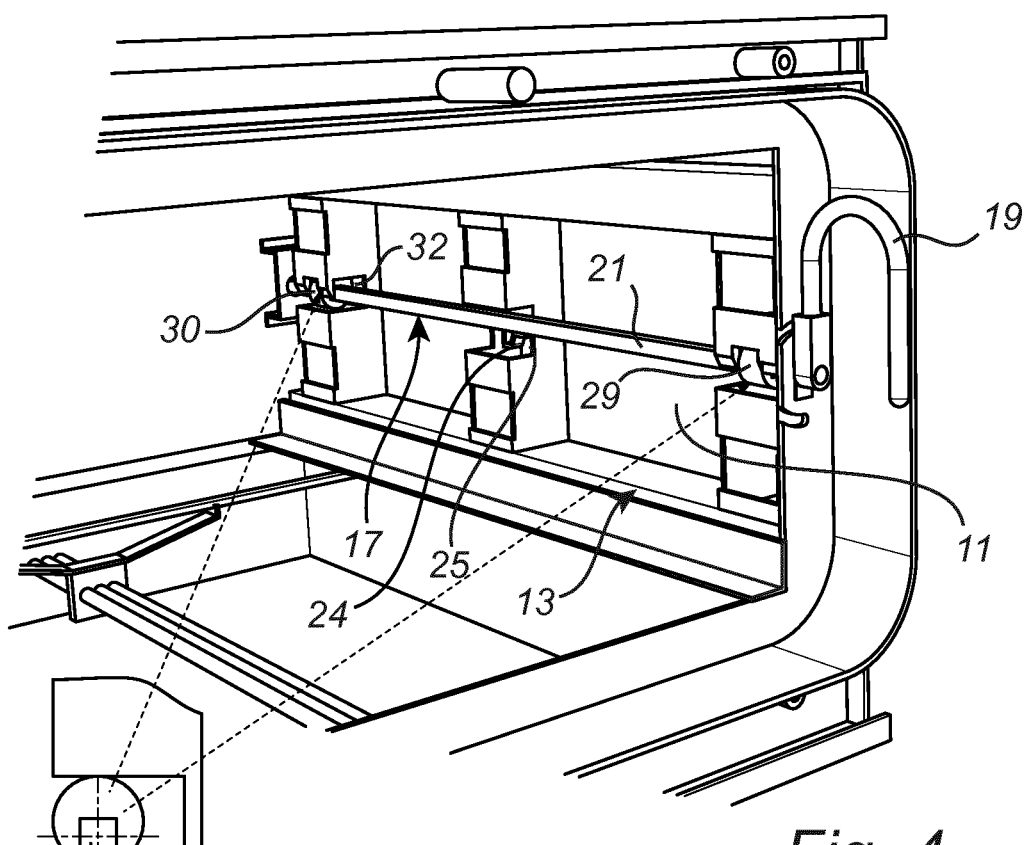
FIGS. 4 to 7 illustrate the operation of a release device of the filter housing.

Referring to FIGS. 1 to 3, an embodiment of the filter housing 1 comprises a box 2 and a cover 3. The filter housing 1, and more particularly its box 2, has a an upstream air entrance opening 4 defined by an air entrance opening frame 5, a downstream air exit opening 6, see FIG. 3, defined by an air exit opening frame 7 and located opposite of the air entrance opening 4, a rear wall 8 extending between and attached with the air entrance opening frame 5 and the air exit opening frame 7, and a front opening 9 opposite to the rear wall 8, the front opening being defined by a front opening frame 10. The cover 3 seals the front opening 9 when the cover 3 is closed, i.e. mounted at the front opening. Furthermore, the filter housing 1 comprises opposite first and second walls 11, 12, which with the spatial orientation shown on the drawings can be called first and second side walls 11, 12. However, they could serve as top and bottom walls as well, with a different mounting of the filter housing 1 in the air ventilation system. Therefore, in this application, the spatial references are related to the air stream through the filter housing, i.e. the upstream and downstream references. The first and second walls 11, 12 extend between the air entrance opening frame 5 and the air exit opening frame 7, as well as between the rear wall 8 and the front opening frame 10, with which they are connected.

Furthermore, the filter housing 1 comprises a movable filter holder 13 arranged within the housing 1 and arranged to receive a filter 14 through the front opening 9. In this embodiment the movable filter holder 13 consists of two separate parts respectively arranged at the first and second walls 11, 12. The filter holder 13 comprises a filter support shelf 44 at each part, carrying the filter 14, see FIG. 5. The filter support shelf 44 extends forwards from the rear wall 8 to the front opening frame 10, and even slightly protrudes in front of the front opening frame 10 at a downstream edge thereof to facilitate the insertion of a filter into the filter housing 1.

Two clamping mechanisms 15, 16 are arranged at the first and second walls 11, 12, respectively. Each clamping mechanism 15, 16 is connected with the filter holder 13 and it comprises a biasing spring device (not shown) for biasing the filter holder 13 in a clamping direction towards the entrance opening frame 5 to clamp the filter 14 in a clamped position by means of a predetermined spring force. The very biasing spring devices are not shown as such, since they are hidden between the filter holder 13 and the respective first and second walls 11, 12, but they can have an ordinary structure as commonly known by the person skilled in the art.

Additionally, the filter housing 1, and more particularly the clamping mechanisms 15, 16, comprise two release devices 17, 18, indicated in FIG. 3, engaged with the filter holder 13 and arranged for releasing the filter 14 from the clamped position to a released position by moving the filter holder 13. Each release device 17, 18 comprises a handle 19, 20 arranged at the front opening 9. Each handle 19, 20 is arranged to be in a locked state when the filter 14 is in the clamped position, arranged to be unlocked by being pulled out a distance to a pulled out and non-rotated position, and arranged to be rotated from the pulled out and non-rotated position to a release position in order to release the filter 14, as will be explained below.

Since the release devices 17, 18 are similarly constructed, only being mirrored, only a first release device 17 will be explained in detail with reference primarily to FIGS. 4 to 7. The release device comprises a centre rod 21, which is connected with the handle 19, 20. The centre rod 21 is rotatably connected with the front opening frame 10, by extending through a hole in a rod seat portion 22 of the front opening frame 10. Furthermore, the centre rod 21 is rotatably connected with the rear wall 8, and more particularly the centre rod 21 extends through a hole in a rod seat portion 23 at the rear wall 8. The centre rod 21 extends along the first wall 11 between the rod seat portions 22, 23. The centre rod 21 is provided with a locking prevention portion 24, which prevents the centre rod 21 from being moved rearwards, and thereby prevents the handle 19 from being pushed in, when the handle 19 has been rotated away from the pulled out and non-rotated position, which positions are inter alia shown in FIGS. 6 and 7. According to the shown embodiment, the locking prevention portion 24 is a protrusion from the centre rod 21, which protrusion 24 is aligned with a corresponding groove, or cut out, 25 of the filter holder 13, and more particularly of an elongated middle bar 26 of the filter holder 13, which middle bar 26 extends in the direction of the air flow through the filter housing, i.e. vertically in the figures. The groove 25 extends in parallel with a portion of the centre rod 21. The protrusion 24 is aligned with the groove 25 merely when the handle is non-rotated, i.e. in its starting position, thereby allowing the centre rod 21 to move longitudinally, and thus allowing the handle 19 to be pulled out and pushed in, respectively.

Figure 5:
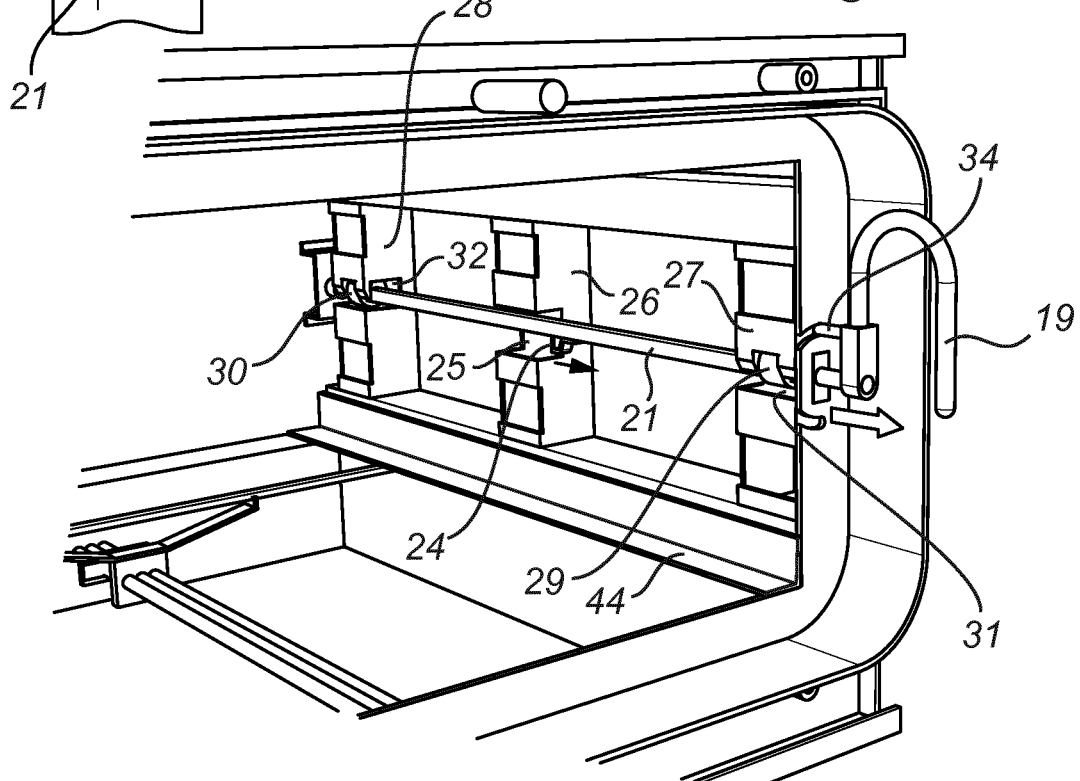

The filter holder further comprises front and rear bars 27, 28, see FIG. 5, which are arranged in parallel with the middle bar 26, at either sides thereof and close to the front opening frame 10 and the rear wall 8, respectively. The release device 17 further comprises two eccentric disks 29, 30, which are rotatably arranged in respective disk seats 31, 32 of the front and rear bars 27, 28. The centre rod 21 extends through the eccentric disks 29, 30 in a movable way. Due to the eccentric disks 29, 30, when the centre rod 21 is rotated the filter holder 13 is moved towards or away from the downstream opening 6, i.e. down or up in the figures. While being rotatable in their disk seats 31, 32, the eccentric disks 29, 30 are fixed axially of the centre rod 21. Therefore, the centre rod is movably engaged with the eccentric disks 29, 30. In order to provide both the axial movement of the centre rod 21, and preventing the centre rod 21 to rotate relative to the eccentric disks 29, 30, the centre rod has a non-circular cross-section, which in this embodiment is square. Each one of the eccentric disks 29, 30 has a correspondingly non-circular hole, with a minor play to the centre rod 21. Consequently, when rotating the centre rod 21 the eccentric disks 29, 30 are brought along in the rotation.

The handle 19 comprises a security element 33, which prevents the handle 19 from being returned to the locked state from the release position if the filter is incorrectly mounted in the filter holder 13. More particularly, in this embodiment, the security element 33 comprises a protrusion, which is a pin, 34, which is arranged to hit the filter 14, thereby preventing the handle 19 from being reversely rotated from the release position, if the filter 14 is not fully inserted into the filter housing 1. The pin 34 is arranged adjacent to, and in parallel with, the centre rod 21. When the handle 19 is in the locked state the pin 34 extends through a first arc shaped aperture 35 of the front opening frame arranged upstream of the centre rod 21, and when the handle is in the fully rotated state the pin 34 extends through a second arc shaped aperture 36 of the front opening frame 10 arranged downstream of the centre rod 21. Thus, when the handle 19 is being rotated from the non-rotated position to the fully rotated position the pin first moves through and out of the first aperture 35 and then into the second aperture 36. When the handle 19 is pushed in as well as pulled out the pin extends more or less through the apertures 35, 36. Thereby, when the handle 19 is in the fully rotated position, the pin protrudes through the second aperture 36 to such an extent that the filter 14 has to be properly inserted into the filter housing 1 to enable reverse rotation of the handle 19 without the pin 34 hitting the filter.

Figure 6:
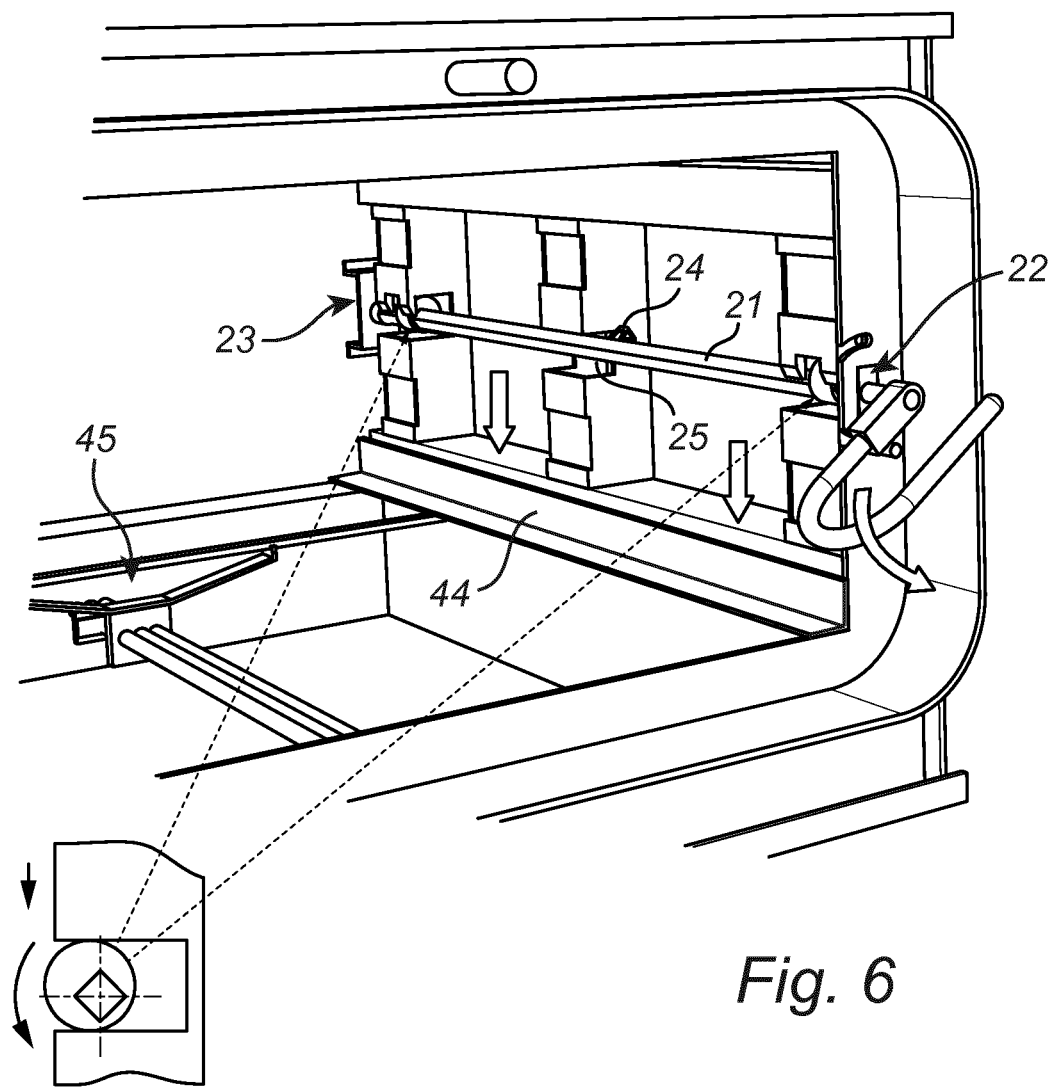
Figure 7:
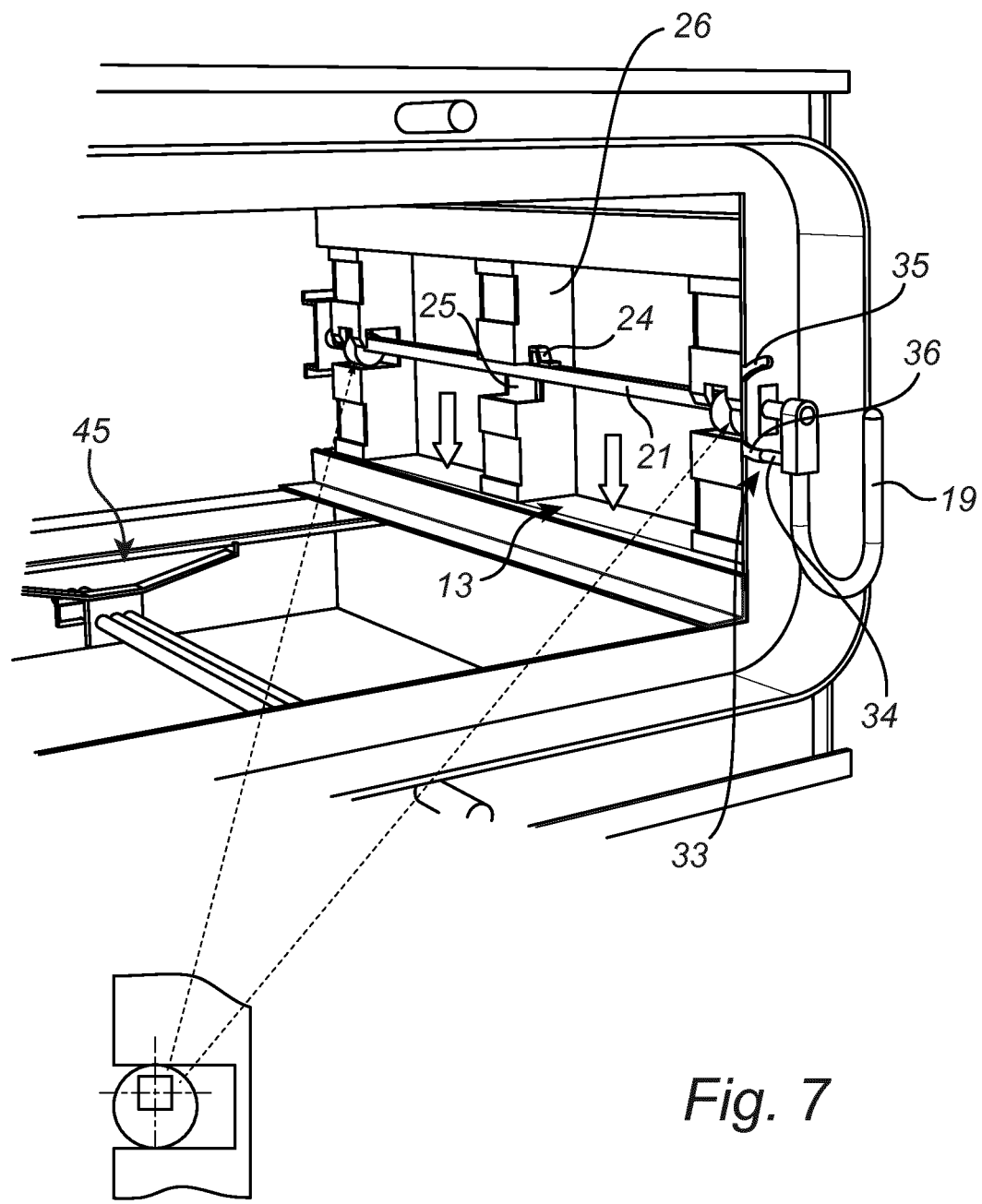

As shown in FIGS. 6 and 7, the filter housing 1 further comprises a probe device 45, which is arranged downstream of the filter holder 13, and thus of the filter 14, for detecting a leak. Since there is no part of the clamping mechanism between the probe device 45 and the filter 14, the air exiting the filter reaches the probe device 45 without being obstructed by such a part, and the probe device can be mounted at an optimum distance from the filter surface.

Figure 9:
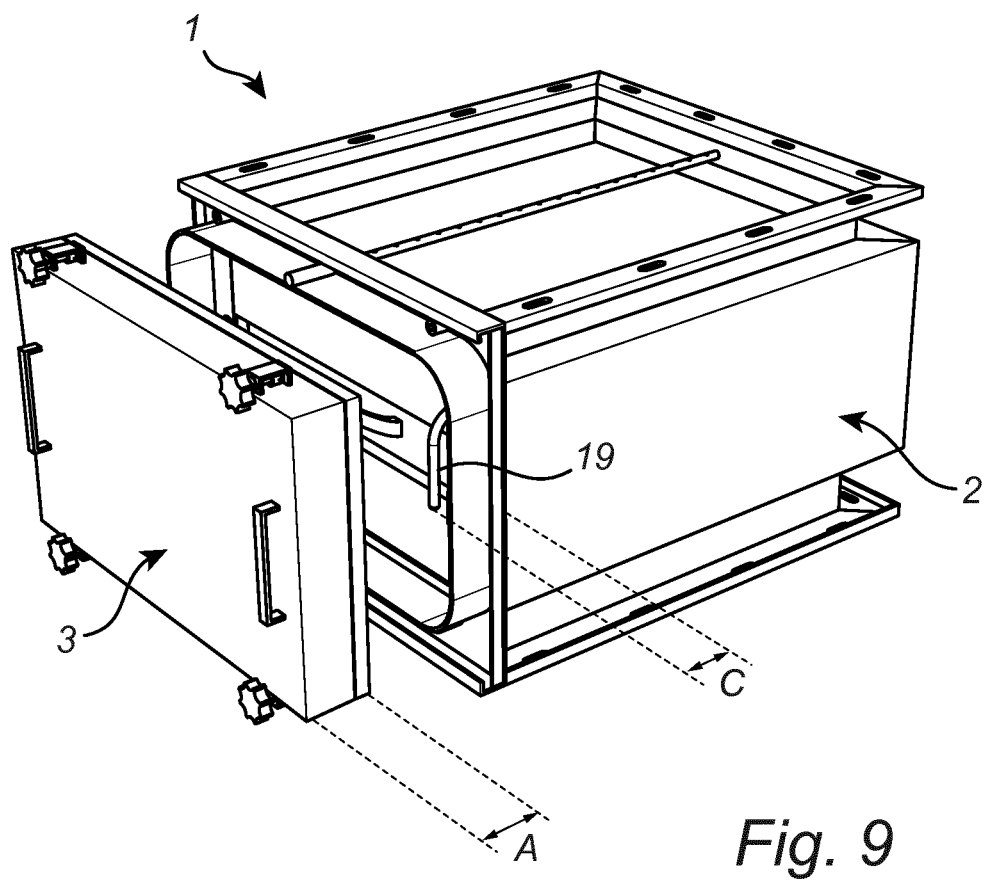
Figure 10:
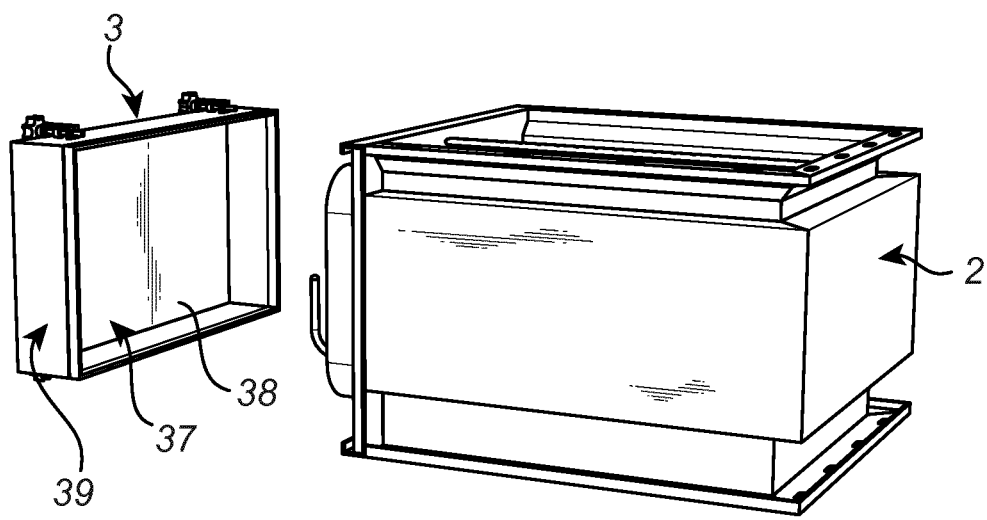
FIG. 10 shows a front cover of the filter housing.
Figure 11:
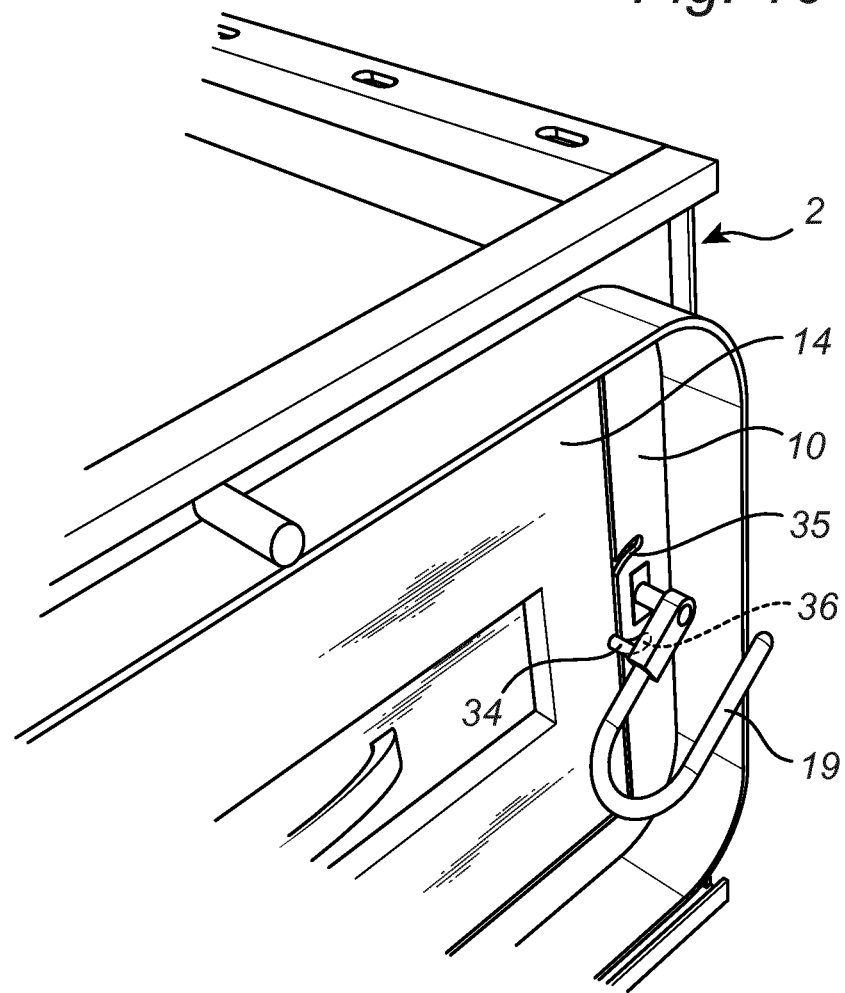
FIG. 11 is an enlarged view of a security detail of the filter housing.

The cover 3 has a recess 37, defined by a front wall 38 and a border 39 extending around the periphery of the front wall 38, see FIG. 11. The handles 19, 20 are received in the recess when the cover 3 is closed, i.e. mounted on the box 2. As illustrated in FIGS. 9 and 10, the recess 37 has a depth A, which is deep enough to enable the cover 3 to seal the front opening 9 when the handles 19, 20 are in the locked state, and protrude a first distance B from the front opening frame 10, and which is shallow enough to disable the cover 3 from sealing the front opening 9 when the handles 19, 20 are in a pulled out state, and protrude a second distance C from the front opening frame 10. It should be noted that filter housing 1 further comprises a bag border 40 extending around the front opening 9. The opening of a bag used when exchanging filters is mounted at the bag border 40, but is not shown in the drawings for reasons of clarity, since it is common knowledge within this field of technology how to apply and use such a bag. The recess 37 of the cover, of course, receives this bag border 40, and a mounted bag as well.

Figure 8:
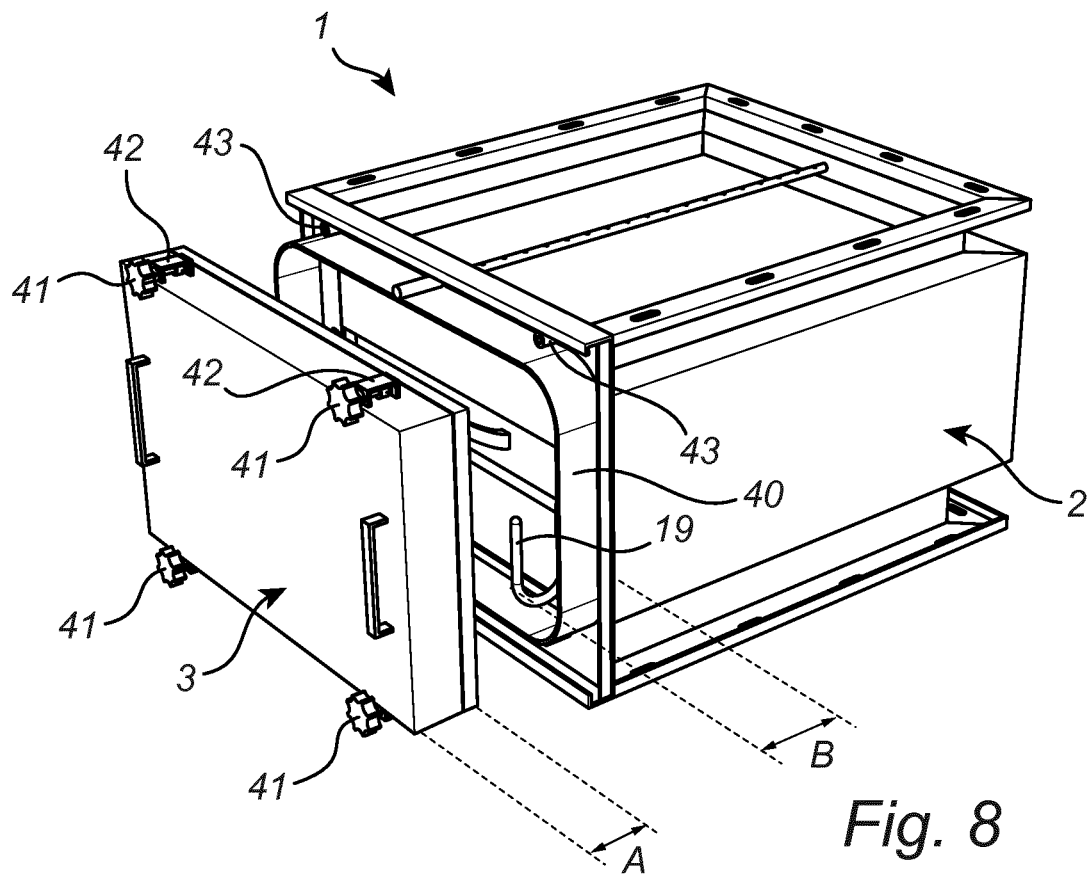
FIGS. 8 and 9 illustrate a safety mechanism of the filter housing.

As best shown in FIG. 8, the cover 3 is provided with four fastening screws 41 arranged in pairs at opposite sides of the cover 3, at the outside of the border 39. Each screw 41 is arranged in a screw holder 42 from which the screw 41 does not protrude. Instead the front opening frame 10 is provided with fixed nuts 43 protruding from the surface of the front opening frame 10. When the cover 3 is mounted, the nuts 43 are received through holes of the screw holders 42 and are then reachable by the screws for engaging their respective threads.

The exchange of the filter includes the following operations. The cover 3 is removed/demounted. The handles 19, 20 are pulled out to unlock them, and thereby the release devices 17, 18, as illustrated in FIG. 5. The handles are then rotated inwards half a turn, i.e. 180 degrees. This means that the first handle 19 is rotated counter clockwise and the second handle 20 is rotated clockwise. By means of this rotation operation the filter holder 13, i.e. the respective filter holder part on each side, is moved downstream, as indicated in FIG. 6. Thereby the biasing springs are compacted and the filter 14 is unclamped. The filter can now be removed and a new filter inserted. Then the flow of operations is reversed to clamp the new filter.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A filter housing adapted to be mounted in an air ventilation system, wherein the filter housing comprises:
   an upstream air entrance opening defined by an air entrance opening frame, a downstream air exit opening defined by an air exit opening frame and located opposite of the air entrance opening, a rear wall extending between and attached with the air entrance opening frame and the air exit opening frame, a front opening opposite to the rear wall, the front opening being defined by a front opening frame, and a cover sealing the front opening when the cover is closed;
   a movable filter holder arranged within the housing and arranged to receive a filter through the front opening; and
   two clamping mechanisms arranged at opposite first and second walls of the housing, which first and second walls extend between the entrance opening frame and the exit opening frame, each clamping mechanism being connected with the filter holder to clamp the filter in a clamped position;
   wherein each clamping device comprises a release device engaged with the filter holder, and arranged for releasing the filter from the clamped position to a released position by moving the filter holder, which release device comprises a handle arranged at the front opening, wherein each release device comprises a non-circular centre rod, which is attached to the handle, and eccentric disks, which are rotatably connected with the filter holder, wherein the centre rod has a non-circular cross-section, wherein the centre rod extends through correspondingly non-circular holes of the eccentric disks, and wherein the centre rod is axially movable and non-rotatable relative to the eccentric disks.

2. A filter housing according to claim 1, wherein each clamping device comprises a biasing spring device for biasing the filter holder in a clamping direction towards the entrance opening frame to clamp the filter in a clamped position by means of a predetermined spring force.

3. A filter housing according to claim 1, wherein each handle comprises a security element, which prevents the handle from being returned to the locked state from the release position if the filter is incorrectly mounted in the filter holder.

4. A filter housing according to claim 3, wherein the security element comprises a protrusion, which is arranged to hit the filter thereby preventing the handle from being reversely rotated from the release position if the filter is not fully inserted into the filter housing.

5. A filter housing according to claim 1, wherein each centre rod is rotatably connected with the front opening frame and the rear wall, and extending along the first or second wall, respectively, wherein the centre rod is provided with a locking prevention portion, which prevents the centre rod from being moved rearwards, and thereby prevents the handle from being pushed in, when the handle has been rotated away from the pulled out and non-rotated position.

6. A filter housing according to claim 5, wherein the filter holder comprises a groove at each centre rod, which groove extends in parallel with a portion of the centre rod, and wherein the locking prevention portion comprises a protrusion, which is aligned with the groove merely when the handle is non-rotated, thereby allowing the handled to be pulled out and pushed in, respectively, when non-rotated.

7. A filter housing according to claim 1, further comprising a probe device, which is arranged downstream of the filter holder for detecting a leak.

8. A filter housing according to claim 1, wherein the cover has a recess in which the handles are received when the cover is closed, wherein the recess has a depth, which is deep enough to enable the cover to seal the front opening when the handles are in the locked state, and which is shallow enough to disable the cover from sealing the front opening when the handles are in a pulled out state.

9. A filter housing according to claim 1, wherein each handle is arranged to be in a locked state when the filter is in the clamped position, arranged to be unlocked by being pulled out a distance to a pulled out and non-rotated position, and arranged to be rotated from the pulled out and non-rotated position to a release position in order to release the filter.

* * * * *